BISTABLE STATE CIRCUIT
Filed July 25, 1950
2 Sheets-Sheet 1
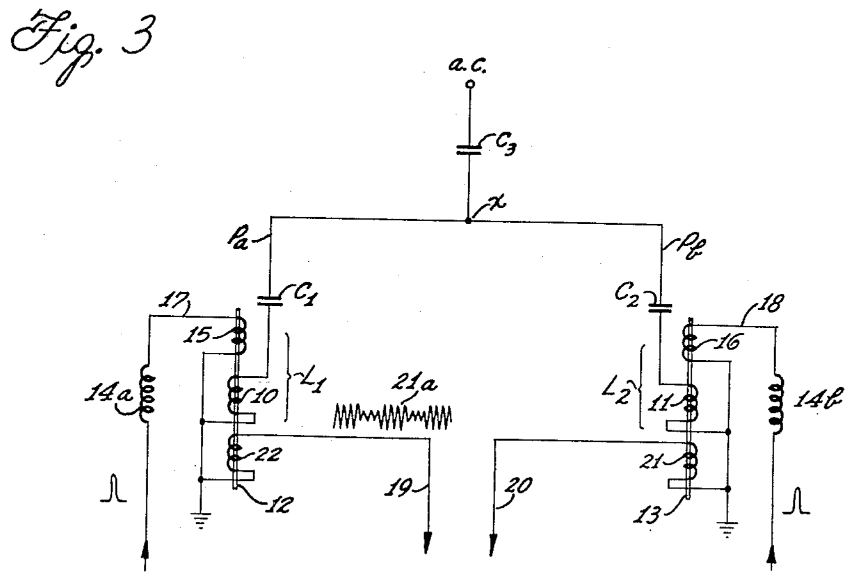
Fig. 3
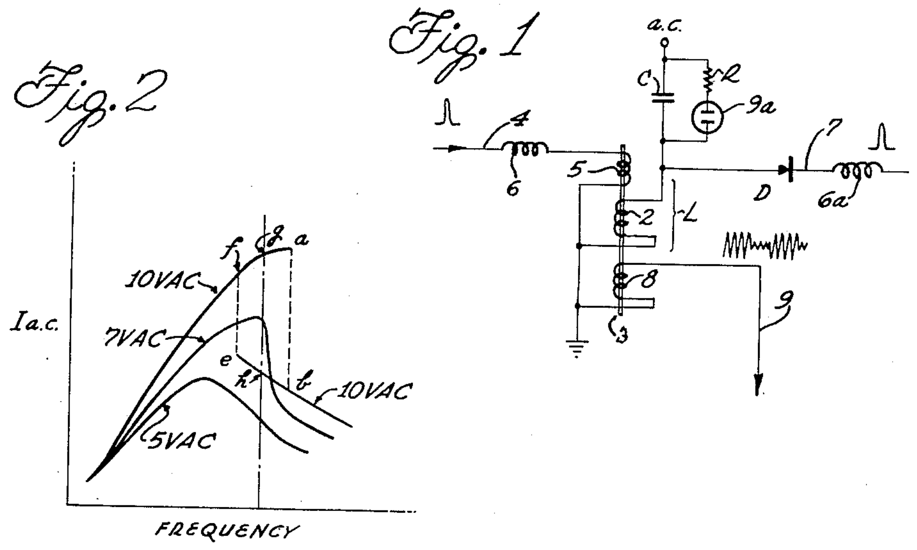
Fig. 1, Fig. 2
Fig. 5
| PULSE INPUT I | A1 | A2 | A3 |
|---|---|---|---|
| 0 | 0 | 0 | 0 |
| 1 | 1 | 0 | 0 |
| 2 | 0 | 1 | 0 |
| 3 | 1 | 1 | 0 |
| 4 | 0 | 0 | 1 |
| 5 | 1 | 0 | 1 |
| 6 | 0 | 1 | 1 |
| 7 | 1 | 1 | 1 |
| 8 | 0 | 0 | 0 |
INVENTOR.
CARL L. ISBORN
BY
Carl L. Isborn INVENTOR.
CARL L. ISBORN
BY
Carl L. Isborn

United States Patent Office 2,822,480

Patented Feb. 4, 1958

2,822,480

BISTABLE STATE CIRCUIT

Carl L. Isborn, Hawthorne, Calif., assignor, by mesne assignments, to The National Cash Register Company, a corporation of Maryland Application July 25, 1950, Serial No. 175,784

32 Claims. (Cl. 307—88)

The present invention relates to a circuit having two conditions of stable equilibrium and more particularly to a reactive circuit adapted to operate in such a manner that in one stable state it has a high current flow and in the other a low current flow.

The use of bistable state circuits as elements in binary counters, storage devices, and the like, is well known in the computer art. These circuits are often referred to as flip-flop circuits because of their ability to suddenly reverse or "flip" from one state of equilibrium to the other.

Flip-flop circuits are commonly constructed by inter-coupling a pair of vacuum tubes together in such a manner that either one tube or the other conducts. When made in this way, these circuits have a relatively short, unpredictable life due to shorts, filament failures, and cathode deterioration, for example. Also considerable power is required in such an arrangement.

One of the objects of the present invention is, therefore, to provide a novel bistable state circuit composed of elements which are highly endurable, thus increasing the life of the circuits both as the result of aging and handling.

Another object of the invention is to provide a novel bistable state circuit having a substantial reduction in power requirement, as compared to tube flip-flops.

Still another object of the present invention is to provide a bistable circuit composed of reactive elements which are relatively simple and inexpensive as compared to tubes.

Briefly, the preferred embodiment of the flip-flop circuit of the present invention has two parallel current paths, each path comprises a capacitor in series with an inductor having a magnetic core. The capacitor ends of these parallel paths are joined and connected through a common coupling element to a low impedance A. C. source. The voltage and frequency of this A. C. source are such that each of these parallel paths tend to go into a series resonant condition, i. e., have a high current flow; however, the impedance of the common coupling element is such that high current can flow in only one path at a time, the other path necessarily having a relatively lower current flow. The flip-flop circuit is triggered from one state of current condition into the other by a trigger pulse which tends to saturate the core of the low current path, for example. The resulting change in inductance causes this latter path, now operating near series resonance, to have a high current flow. Since both paths cannot be heavily conducting at the same time, the path which formerly had a high current flow has a low current flow therethrough. Output leads associated with each of the paths are provided having voltages thereon indicative of the state of the flip-flop circuit.

This invention will be more readily understood by reference to the appended drawings in which:

Figure 1 is a circuit diagram of the basic bistable state circuit.

Figure 2 is a plot showing the characteristic operating curves of the bistable state circuit in Figure 1.

Figure 3 is a circuit diagram showing the preferred form of the flip-flop circuit of the present invention.

Figure 5 is a chart showing the state the counter flip-flops assume when counting in a binary manner.

Figure 4:
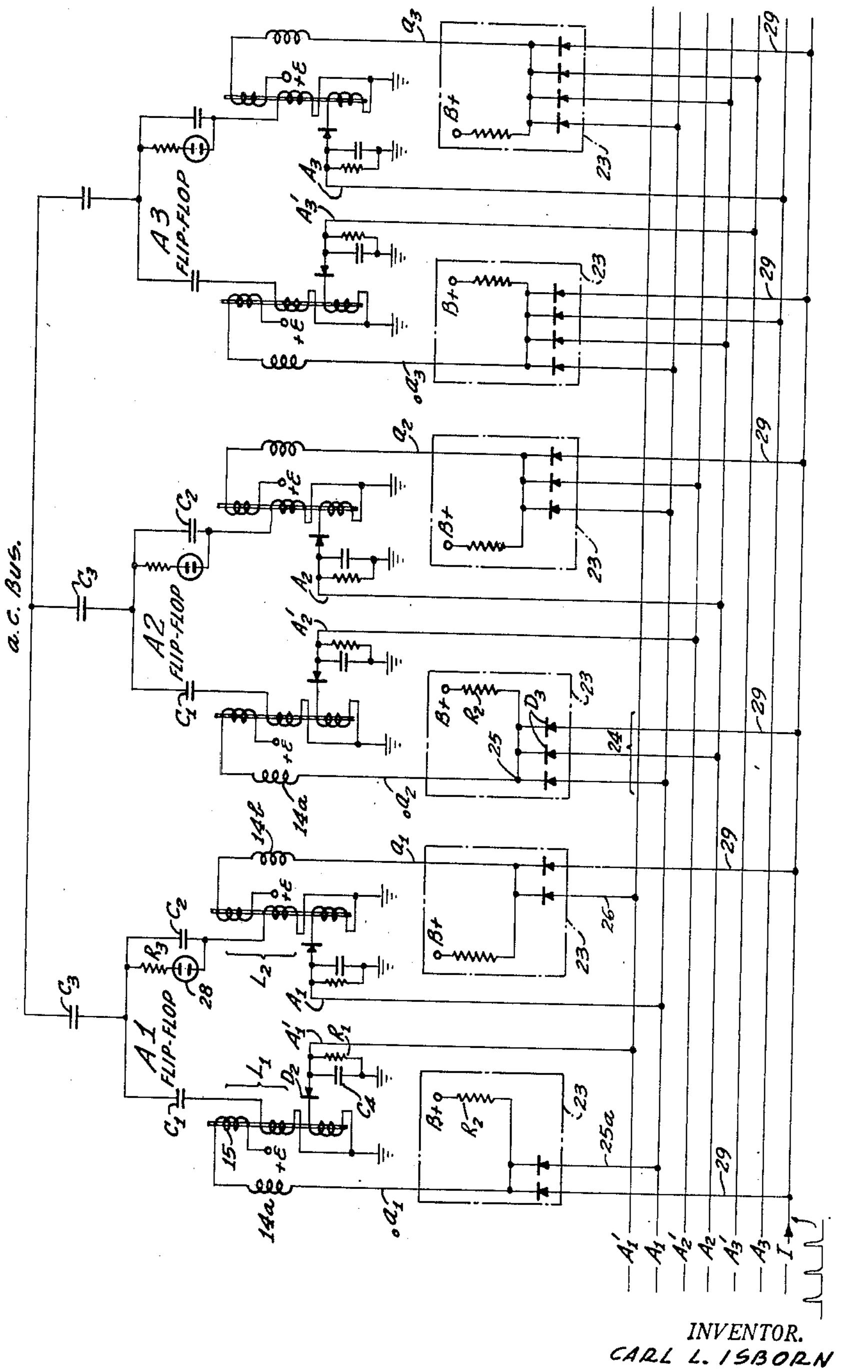
Figure 4 is a circuit diagram of a gated, parallel, binary counter using the flip-flop circuits of the present invention.

Referring first to Figure 1, the basic bistable state circuit of the present invention will first be described. This circuit is shown to be a series reactive circuit comprised of a capacitor C in series with an inductor L. Inductor L is made up of a coil 2 having a small ferromagnetic core 3 comprised, for example, of a thin sheet of metal rolled in the form of a scroll. This core is preferably composed of a metal whose change in permeability varies over a considerable range with changes in flux density.

A low impedance A. C. potential source is applied to the capacitor end of this series reactive circuit, the inductor end thereof being connected to the source through ground.

Two input leads are provided. A first trigger input lead 4 is connected to a trigger coil 5 having a large number of windings around core 3. The other end of trigger coil 5 is grounded. An R. F. choke coil 6 is placed in the first trigger input lead 4 for preventing the A. C. frequency in the core 3 from being reflected back into the first input. A second trigger input lead 7 is connected through a damping diode D preferably to the common junction between capacitor C and inductor L. An R. F. choke coil 6a is also placed in the second input lead 7. An output coil 8, also wound about core 3, provides means for obtaining an output voltage indicative of the state of the circuit. One end of output coil 8 is grounded and the other end is connected to an output lead 9.

To gain some insight into the nature of the bistable state of the present circuit, consider the current vs. frequency curves shown in Figure 2. These curves show the operating characteristics of the basic circuit in Figure 1. As noted in the curves, the resonance frequency, i. e., the frequency of peak current flow increases as the A. C. voltage increases from 5 v. to 7 v. This change in the resonant point frequency is due to the increase in current through the coil 2 due to the higher applied A. C. voltage. As a consequence of this increased current flow, the permeability of the core 3 decreases and a corresponding change occurs in the effective inductance of the inductor L. Thus, the resonant frequency of the LC path changes to a higher frequency.

Note that the declining part of each constant A. C. voltage curve becomes sharper and sharper as the voltage increases until at 10 volts there is a definite drop after the peak, such as shown at point *a* where the current flow suddenly falls to a lower stable point *b*. This is due to the fact that as the frequency increases the large series resonant current can no longer cause a corresponding reduction in the effective inductance of L. The result of this phenomenon is that the current starts to drop and the inductance of L starts to increase. The effect is a positive regeneration which settles at a low current flow, such as point *b*. If the frequency is now still further increased, the current flow slowly decreases as shown by the lower portion of the 10 v. curve. It should be noted that the 7 v. curve also shows effects of positive regeneration but in this case the effect is not strong enough to cause as definite a drop after the peak. Any A. C. voltage curve of 10 v. or more, for the plot in Figure 2, has this characteristic drop in current flow.

Now if the lower portion of the 10 v. curve is retraced by decreasing the frequency, it will be found that the current will not suddenly increase at the same frequency at which it dropped. Instead it will slowly rise until at some point *e* it will suddenly increase. The reason for this delay in the jump is that the current at point *b* is low, the effective inductance of L is large, and the apparent resonant frequency point is much lower than point *a*. As the frequency is continually decreased, however, the current will steadily rise as this apparent resonant point is approached, until at some point *e* the current will be large enough that the current starts to reduce the effective inductance of L. The reduction of this inductance raises the apparent resonant point, thus increasing the current, and consequently decreasing the inductance again, etc., until the current jumps up to point *f*.

Any pair of points of constant frequency, such as point *g* on the upper 10 v. curve and point *h* on the lower 10 v. curve, are possible points of operation in the region of bistability; that is, once the circuit of Figure 1 is at point *g*, for example, it will stay there with a high current flow through its inductor L and capacitor C until the circuit is properly triggered to place it in the other state defined by point *h*. A neon bulb 9*a* connected in series with a resistor R across capacitor C may be provided for indicating the state of the circuit. This bulb 9*a* is lit only when the circuit is in the high current conducting state.

On examining the two stable states of Figure 2, it should be noted that when operating at a point on the upper curve, such as point *g*, the circuit is predominantly capacitive and when operating on the lower curve, such as point *h*, the circuit is predominantly inductive. Thus in addition to flipping from a high current flow to a low current flow, the circuit flips from one side of a fictitious resonant point to the other.

Assuming the circuit is operating at 10 v. with an A. C. fixed frequency defined by line *g*—*h*, the manner of triggering the basic bistable circuit will next be described.

When the 10 v. A. C. is first applied to the circuit of Figure 1 it may settle in either of the stable states. Assume that the circuit is initially in stable state *g* with a high current conduction. If a positive pulse is applied on second triggering input lead 7, the diode D is rendered operable such that the current flow through the coil 2 of the circuit is damped causing the circuit operation to drop to point *h* of the curves in Figure 2. The circuit is now in its opposite stable state and will stay there until triggered by a positive pulse on first triggering input lead 4. This latter pulse tends to saturate the core 3. As a result, the effective inductance of inductor L decreases and the LC circuit is brought toward a resonant condition which increases the current conduction and flips the circuit to point *g* of the curve in Figure 2. Thus, it is seen that a pulse on the first triggering input lead 4 flips the series reactive circuit to a high current conduction state, and a pulse on the second triggering input lead 7 flips the circuit to a low current conduction state. The state of the circuit is evidenced by the relative magnitude of the A. C. voltage on output lead 9.

Referring next to Figure 3, the preferred flip-flop circuit of the present invention is shown. This circuit comprises left and right parallel current paths P*a* and P*b*, respectively, each path similar to the circuit in Figure 1. Path P*a* includes a capacitor $C_1$ in series with inductor $L_1$; and, path P*b* includes capacitor $C_2$ in series with inductor $L_2$. The corresponding elements in each of these parallel paths have the same values. The capacitor ends of paths P*a* and P*b* are joined at common point X and connected through a common load capacitor $C_3$ to a low impedance A. C. potential source. Each of the inductors $L_1$ and $L_2$, as before, is made up of a coil 10 and 11 having a small ferro-magnetic core 12 and 13, respectively.

A left input trigger coil 15, having a large number of windings, is wound about the left core 12 and a similar right input trigger coil 16 is wound about the right core 13. One end of each of the trigger coils is connected to ground. Trigger input leads 17 and 18, having radio frequency choke coils 14*a* and 14*b* therein, are connected to the other ends of the left and right trigger coils 15 and 16, respectively.

Two outputs, one from each path, are provided in the preferred embodiment of the flip-flop circuit. A left output coil 22 is wound about the left core 12 and a right output coil 21 is wound about the right core 13. One of the ends of each of these left and right output coils is grounded and the other ends are connected to output leads 19 and 20, respectively.

The load capacitor $C_3$, in the present circuit, was chosen so that only one of the parallel paths can have a high current flow at a time. Hence, when the flip-flop is in the condition with P*a* highly conducting, if trigger coil 16 (in the low current conducting path P*b*) is pulsed, the inductance of $L_2$ is momentarily reduced. This is due to the saturation of the core 13 by the trigger pulse. The increased current flow through path P*b* causes the voltage at point X to drop, and consequently the current in path P*a* drops to point *h* of the curves in Figure 2. The circuit is now in its opposite stable state and will stay there until a momentary aiding current trigger pulse, either of a positive or negative polarity, is applied to path P*a*, at which time the current in this latter path jumps up to point *g* where it will remain.

It is thus seen that one of the parallel paths must have a high current flow at all times, but never both at one time. If both sides of the circuit shown in Figure 3 should attempt to be low conducting, the voltage at point X to ground goes high. This high voltage at point X insures that one side or the other will have a high current flow. Once this happens the voltage at point X drops since the resonance between $C_3$ and the two paths has been destroyed.

It should be noted that the common coupling element, connecting the paths to the low impedance source in the preferred embodiment of the invention, should not be limited to a capacitor since either a resistor or an inductor can perform the same function as the $C_3$ capacitor.

In operation, the left and right output leads 19 and 20, respectively, of the flip-flop circuit have an A. C. voltage output impressed thereon whose amplitude varies in accordance with the current flow through the paths P*a* and P*b*, respectively. The nature of this output is shown by the A. C. wave pattern 21*a*, on the left output line 19.

Except for the extreme sensitivity of the circuit near the operating limits defined by lines *f*—*e* and *a*—*b* in Figure 2, the flip-flop circuit can be operated anywhere within these limits. The nearer the operating point is to limit *a*—*b*, however, the harder the triggering and the larger the output from the circuit. On the other hand, the nearer the operating point is to limit *f*—*e*, the easier the triggering and the lower the power output becomes.

Since the preferred embodiment of the flip-flop circuit shown in Figure 3 has all reactive elements, the power requirement of this circuit is quite small; the only power dissipation being in the inherent resistance associated with the coils and the dielectric loss in the capacitors.

It should be pointed out that these flip-flop circuits can use solenoid type cores of any non-permanent magnetic material. However, this phenomenon of changing permeability is most pronounced in the high $\mu$ alloys and hence they are preferable. The use of a small core is desirable because higher A. C. frequencies can be used. This enables one to use higher triggering pulse rates since these latter pulses are preferably not higher than about one-fourth the A. C. applied frequency in order to ensure that the envelope of the A. C. output waves is substantially a square wave.

Referring next to Figure 4, a gated, parallel counting circuit is shown utilizing the preferred flip-flop circuits A1, A2, and A3 of the present invention for the first three binary stages thereof, respectively.

The nomenclature used for the inputs and outputs of these flip-flops is to denote the outputs by the capital letter A with an appropriate subscript; the left output being differentiated by an affixed "prime." The inputs are designated by the small letter *a* with an appropriate subscript. The left input being further characterized by a subscript zero preceding the small letter *a*.

In this particular counter, it is desired to have a D. C. voltage on the outputs from the flip-flops, hence a rectifying diode, such as diode $D_2$, together with a filter circuit comprised of a resistor, such as resistor $R_1$, and a capacitor, such as capacitor $C_4$, is located in each of the output leads from the flip-flops.

A diode gating circuit 23 is connected to each of the input leads ${}_0a_1$, $a_1$, ${}_0a_2$, etc. to the flip-flops. These diode gating circuits are all similar in nature, so that only the one connected to the left input ${}_0a_2$, of flip-flop A2, will be described in detail. Gating circuit 23 has a plurality of gate input leads 24, in this case three. Each gate input lead has a separate diode, such as gate diode $D_3$ therein. The plates of all these gate diodes $D_3$ are joined to a common junction, such as junction 25. This junction is then connected through a resistor, like resistor $R_2$, to a high D. C. potential source B. The output line from the common junction 25 of the particular gating circuit described is connected through RF choke 14*a*, to the left input ${}_0a_2$ of flip-flop A2. The potential on common junction 25 is relatively high only when all the inputs to gating circuit 23 are of a relatively high potential. If any one or more of the inputs are of a relatively low potential, the output from common junction 25 is relatively low in potential because of the diode current flowing through load resistor $R_2$.

It should be noted that to ensure that a trigger input coil, such as 15, carries current only when gate junction 25 is sufficiently high, all the trigger input coils are returned to a slightly positive bias D. C. voltage +E.

In order to clearly show the manner of interconnecting the stages of the parallel counter, all the outputs from the flip-flops, as shown in Figure 4, are extended downward and connected to horizontal leads having the same symbol reference designation as these outputs. It should be noted that the input line to the counter is represented by an additional horizontal lead, designated by the letter I. Every input gating circuit 23 has one of its gate input leads connected to this I horizontal lead by a pulse line, like line 29. The remaining gate input leads are connected to these horizontal leads in a manner to be described.

The number convention employed in the present bistable circuits is to consider a digit one to be in a flip-flop when its right output has a relatively high current flow, and to consider a digit zero therein when the left output has a relatively high current flow. A neon light 28, connected in series with a resistor $R_3$ across the right capacitor $C_2$ of each flip-flop, is lit whenever the flip-flop contains the digit one.

The automatic shifting of the states of the flip-flops in the counter upon receipt of each input pulse is accomplished by interconnecting the output of the flip-flops to the inputs according to a scheme shown by a binary number table in Figure 5. There it is noted that the first flip-flop A1 changes to an opposite state every time a positive input pulse appears on horizontal lead I. Hence, this flip-flop "looks" to its own state in order to know when to change. Thus the potential output $A_1$ in Figure 4 is connected by line 25*a* to the gating circuit feeding input ${}_0a_1$, and output $A_1'$ is connected by line 26 to the gating circuit feeding input $a_1$.

Referring again to the binary table in Figure 5, it is noted that all of the flip-flops, after the first, change to a one state when, and only when, all the previous flip-flops are in a one state. That is to say, a necessary and sufficient condition required for enabling a flip-flop after the first to change to a one state on the next input pulse is for all the previous flip-flops to indicate a one.

In a similar manner, a necessary and sufficient condition required for enabling a flip-flop to change to a zero state on the next input pulse is for all the previous flip-flops, in addition to the flip-flop in question, to be in a one state.

In Figure 4, all the output conditions required to make a flip-flop change to a given state are communicated by appropriate output leads to the diode gate circuits 23 feeding the input which places that flip-flop in the given state. For example, in order to make flip-flop A3 change to a one state, the condition of the counter flip-flops must be such that the right outputs $A_1$ and $A_2$ are of a relatively high potential the same time that the left output $A_3'$ is of a relatively high potential. Thus these outputs are communicated to the particular gating circuit 23 connected to input $a_3$, and at the coincidence of the next input pulse on horizontal lead I, the A3 flip-flop is triggered to a one state.

In operation of the above described gated parallel counter, all of the gating circuits 23 have positive input pulses impressed on horizontal lead I fed simultaneously into one of their inputs, as previously described. These input pulses are sufficiently spaced in time so that any flip-flops which are triggered by an input pulse have a chance to settle to their new states before the successive triggering input pulse arrives on horizontal lead I.

While the mechanism and circuits as herein shown and described are admirably adapted to fulfill the objects of the present invention as previously stated, it is to be expressly understood that the invention is not to be limited to the arrangement of the preferred embodiment disclosed, for the invention is susceptible of embodiment in various forms all coming within the legitimate and valid scope of the appended claims.

What is claimed is:

1. A bistable state reactive circuit comprising a capacitor and an inductor having a magnetic core, means for connecting an A. C. source across said circuit, the frequency and voltage of said A. C. source being established at such values that said reactive circuit is operated in the bistable range of its current vs. frequency characteristic curve, and means for triggering said reactive circuit to an opposite stable condition.

2. A bistable state reactive circuit comprising a capacitor in series with an inductor having a ferromagnetic core, means for connecting an A. C. source across said circuit, the frequency and voltage of said A. C. source being such that said reactive circuit is operated in the bistable range of its current vs. frequency characteristic curve, a first input means for triggering said circuit to one stable state, and a second input means for triggering said circuit to the other stable state, and means for providing a voltage signal output corresponding to the state of said circuit.

3. A bistable state reactive circuit comprising a capacitor in series with an inductor having a ferromagnetic core, means for connecting an A. C. source across said circuit, the frequency and voltage of said A. C. source being such that said reactive circuit is operated in the bistable range of its current vs. frequency characteristic curve, a first input means for triggering said circuit to a high current conduction state by saturating said core, and a second input means for triggering said circuit to a low current conduction state by by-passing the current flow around said inductor.

4. A flip-flop circuit comprising two reactive circuits connected in parallel, each of said reactive circuits having a capacitor in series with an inductor, each of said inductors having a core of magnetic material, a common impedance means connecting said parallel reactive circuits to a source of alternating current, the frequency and voltage of said alternating current being such that, after the voltage drop through said common impedance means, said reactive circuits are operated in the bistable range of their current vs. frequency characteristic curve, and means for triggering said reactive circuits to opposite stable conditions.

5. A flip-flop circuit comprising two reactive circuits connected in parallel, each of said reactive circuits having a capacitor in series with an inductor, each of said inductors having a core of magnetic material, a common impedance element connecting said reactive circuits to a source of alternating current, the frequency and voltage of said alternating current being such that, after the voltage drop through said common impedance element, said reactive circuits are operated in the bistable range of their current vs. frequency characteristic curve with one of said reactive circuits in a predominantly inductive condition and the other in a predominantly capacitive condition, means for triggering said reactive circuits to opposite stable conditions, and means for providing a voltage signal output corresponding to the state of said flip-flop circuit.

6. A flip-flop circuit comprising two reactive circuits connected in parallel, each of said reactive circuits having a capacitor in series with an inductor, each of said inductors having a magnetic core with a variable permeability, a common impedance element connecting said reactive circuits to a source of alternating current, the frequency and voltage of said alternating current being such that, after the voltage drop through said common impedance element, said reactive circuits are operated in the bistable range of their current vs. frequency characteristic curve with one of said reactive circuits near a resonant condition and the other in a non-resonant condition, and a trigger circuit means which tends to saturate the core of the inductor in the non-resonant reactive circuit whereby said reactive circuits are flipped to opposite stable conditions.

7. Apparatus in accordance with claim 6 wherein said common impedance element is a capacitor.

8. Apparatus in accordance with claim 6 wherein said trigger circuit means includes a trigger coil wound around the core of each of said inductors.

9. A flip-flop circuit comprising two reactive circuits connected in parallel, each of said reactive circuits having a capacitor in series with an inductor, each of said inductors having a ferromagnetic core, a common impedance element connecting said reactive circuits to a source of alternating current, the frequency and voltage of said alternating current being such that, after the voltage drop through said common impedance element, said reactive circuits are operated in the bistable range of their current vs. frequency characteristic curve with one of said reactive circuits having a relatively large current conduction and the other having a relatively small current conduction, a trigger circuit for saturating the core of the inductor having a small current conduction whereby said reactive circuits are flipped to opposite stable conditions, and output circuit means having a voltage thereon indicative of the condition of each of said parallel reactive circuits.

10. Apparatus in accordance with claim 9 including rectifying means in said output circuits for converting the A. C. output thereon into a D. C. potential.

11. Apparatus in accordance with claim 9 wherein said output circuit means includes an output coil wound around the core of each of said inductors.

12. Apparatus in accordance with claim 9 wherein said output circuit means includes an output coil wound around the core of each of said inductors, and a rectifier and a filtering circuit for converting the A. C. output thereon into a D. C. potential.

13. Apparatus in accordance with claim 9 including blocking means in said trigger circuits to prevent the A. C. frequencies of said reactive circuits from reflecting back into said trigger circuits.

14. Apparatus in accordance with claim 9 wherein triggering pulses are fed into said trigger circuit, the repetition rate of said triggering pulses being less than the frequency of said A. C. source.

15. A bistable state reactive circuit comprising: a capacitor and a non-linear inductor; means for connecting an alternating current source across said circuit, the frequency and voltage of said alternating current having such values that said reactive circuit is operated in the bistable current-conducting range of its current vs. frequency characteristic curve; and means varying the instance of said conductor for triggering said reactive circuit from either of its bistable current-conducting states to the opposite bistable current-conducting state.

16. A bistable state circuit making use of the principle of ferroresonance which comprises: a capacitor; an inductor; a ferromagnetic solenoid type core for said inductor; means for connecting said capacitor and inductor in series and to a source of alternating current whose voltage and frequency are operable to create either of two stable current conditions of ferroresonance in said core; a first input means for triggering said circuit to one stable current condition; and a second input means for triggering said circuit to the other stable current condition.

17. A bistable state circuit which comprises: a capacitor; an inductor having a ferromagnetic core; means connecting said capacitor and said inductor in series with each other to form a series circuit; other means for connecting said series circuit to a source of alternating current whose frequency and voltage are such as to operate said series circuit in its bistable ferroresonant condition; trigger means for saturating said core of said inductor to trigger said series circuit to a stable high condition; and other trigger means connected to said series circuit and operable to trigger said series circuit to a stable low current condition.

18. A bistable state circuit which comprises: a capacitor; an inductor having a ferromagnetic core; means connecting said capacitor and said inductor in series with each other to form a series circuit; other means for connecting said series circuit to a source of alternating current whose frequency and voltage are such as to operate said series circuit in the region of its bistable ferro-resonant condition; trigger means connected to said series circuit and operable to trigger said circuit to a stable high current condition; and other trigger means connected to said series circuit and operable to divert current from at least said inductor of said series circuit and thereby trigger said series circuit to a stable low current condition.

19. A bistable state circuit which comprises: a capacitor; an inductor having a ferromagnetic core; means connecting said capacitor and said inductor in series with each other to form a series circuit; other means for connecting said series circuit to a source of alternating current whose frequency and voltage are such as to operate said series circuit in the region of its bistable ferroresonant condition; trigger means operable to saturate said core of said inductor and thereby trigger said series circuit to a stable high current condition; and other trigger means connected to said series circuit and operable to divert current from at least said inductor of said series circuit and thereby trigger said series circuit to a stable low current condition.

20. A bistable state circuit which comprises: a capacitor; an inductor having a ferromagnetic core; means connecting said capacitor and said inductor in series with each other to form a series circuit; other means for connecting said series circuit to a source of alternating current whose frequency and voltage are such as to operate said series circuit in the region of its bistable ferroresonant condition; trigger means operable to saturate said core of said inductor and thereby trigger said series circuit to a stable high current condition; other trigger means connected to said series circuit and operable to trigger said circuit to a stable low current condition;

and pick-off means inductively coupled to said core of said inductor for providing an output whose magnitude may be either of two values, corresponding to the current condition of said series circuit.

21. A bistable state circuit which comprises: a capacitor; an inductor having a ferromagnetic core; means connecting said capacitor and said inductor in series with each other to form a series circuit; other means for connecting said series circuit to a source of alternating current whose frequency and voltage are such as to operate said series circuit in the region of its bistable ferroresonant condition; trigger means operable to saturate said core of said inductor and thereby trigger said series circuit to a stable high current condition; other trigger means connected to said series circuit and operable to divert current from at least said inductor of said series circuit and thereby trigger said series circuit to a stable low current condition; and pick-off means inductively coupled to said core of said inductor for providing an output whose magnitude may be either of two values, corresponding to the current condition of said series circuit.

22. A bistable state circuit which comprises: a pair of branch circuits each including a capacitor, an inductor having a ferromagnetic core, and means connecting said capacitor and said inductor in series with each other to form a series circuit; a conductor connecting the capacitor ends of said branch circuits together to a common junction; another capacitor connected to said common junction; other means connecting said last-mentioned capacitor and the inductor ends of said branch circuits to a source of alternating current whose frequency and voltage are such as to operate said branch circuits in the region of their bistable ferroresonant condition, said last-mentioned capacitor having an impedance such that only one of said branch circuits of the series-parallel circuit thus formed may operate in a high current condition at any one time; and separate trigger means coupled to said cores of said inductors for individually saturating said core of the associated inductor and thereby triggering the branch circuit of which said inductor forms a part, to a stable high current condition, the other of said branch circuits being simultaneously driven to a stable low current condition.

23. A bistable state circuit as defined in claim 22 having separate pick-off means inductively coupled to the core of each of said inductors for providing an output whose magnitude may be either of two values, corresponding to the current condition of the branch circuit of which said inductor forms a part.

24. In a flip-flop circuit, an alternating voltage input circuit having impedance, a pair of branch circuits shunt connected across said input circuit, each said branch comprising a series arrangement of a capacitance and and an inductor, said inductors having inductance values variable in accordance with current therein, a source of voltage, and means for applying said voltage to said branches to vary the current therein in accord with the magnitude of said voltage, whereby when either of said circuits becomes ferroresonant a greater current flows in said impedance tending to reduce the voltage applied to the other circuit.

25. A flip-flop circuit having two stable states of conduction, comprising a pair of branch circuits shunt connected to each other and to a source of alternating voltage, each said branch comprising a series resonant non-linear circuit arrangement of a capacitance and saturable-core inductor, said inductors having inductance values variable in accordance with current therein, means maintaining one said branch in a state of high-current conduction while the other in a state of low-current conduction, and means for varying the current in said branch circuits, whereby to produce simultaneous changes of state in each said branch.

26. In a flip-flop circuit, an alternating voltage input circuit, including an impedance, a pair of non-linear circuits shunt connected to each other and to said input circuit, and electric-circuit means coupled to said circuits for varying the current in said branch circuits simultaneously and in opposite senses, whereby one said circuit is caused to assume a high-current-conduction state and the other said circuit simultaneously assumes a low-current-conduction state.

27. A wave translating circuit, comprising two branches arranged electrically in parallel, each branch including an inductor and a capacitor in series with said inductor, an alternating voltage input circuit connected across said branches and of sufficient magnitude to maintain one said branch in a first stable state of conduction and simultaneously to maintain the other said branch in a second stable state of conduction, and a source of electrical impulses connected in energy coupling relation with said inductors, whereby excitation of said branches by said impulses tends to reduce the impedance of one said branch and simultaneously to increase the impedance of the other said branch, and an output connection associated with one said branch.

28. In combination, a source of alternating electromotive force, a pair of branches connected across said source through a common impedance, each of said branches comprising an inductance having an iron core and a capacitance in series, said electromotive force and impedance being of such value that one of said branches is resonant and the other non-resonant, and means to apply a control voltage to both said branches to cause said one branch to become non-resonant and said other branch resonant.

29. A flip-flop circuit having two stable states of conduction, comprising a pair of branch circuits shunt connected to each other and to a source of alternating voltage, each said branch comprising a non-linear resonant circuit arrangement of a capacitance and saturable-core inductor, said inductors having inductance values variable in accordance with current therein, means maintaining one said branch in a state of high-current conduction while the other in a state of low-current conduction, and means initiating a change in permeability of said cores, whereby simultaneous changes of state are produced in each said branch.

30. A flip-flop circuit comprising a capacitance and an inductor having a ferromagnetic core, means connecting said inductor and said capacitance to a source of alternating voltage, means including an input connection coupled to said inductor for varying the saturation of said core such that said circuit is maintained in a resonant condition when the saturation of said core is increased and in a non-resonant condition when the saturation of said core is decreased, and an output connection associated with said circuit.

31. A bistable state reactive circuit comprising: a capacitor and an inductor; a ferromagnetic core for said inductor; means connecting an alternating current source across said circuit; and means for initiating a change in permeability of said core, said capacitor and inductor being so proportioned that the effective impedance of said circuit is rendered predominantly inductive when said permeability increases, and predominantly capacitive when said permeability decreases.

32. An alternating current circuit comprising: an impedance; a circuit network having two like parallel branches connected in series with said impedance, each said branch including a capacitive element in series with a winding magnetically interlinked with an element having magnetic properties, and each said branch including another winding magnetically interlinked with said first winding.

(References on following page)

References Cited in the file of this patent

UNITED STATES PATENTS

| | | |
|---|---|---|
| 1,952,186 | Suits | Mar. 27, 1934 |
| 1,968,576 | Suits | July 31, 1934 |
| 2,428,990 | Rajchman | Oct. 14, 1947 |
| 2,443,488 | Wilkinson | June 15, 1948 |
| 2,445,800 | Mortlock | July 27, 1948 |
| 2,519,513 | Thompson | Aug. 22, 1950 |
| 2,524,154 | Wood | Oct. 3, 1950 |

OTHER REFERENCES

Publication: Proceedings of the I. R. E., vol. 38, #6, June 1950, title "Magnetic Triggers," by On Wang.

U. S. DEPARTMENT OF COMMERCE

PATENT OFFICE

CERTIFICATE OF CORRECTION

Patent No. 2,822,480 February 4, 1958

Carl L. Isborn

It is hereby certified that error appears in the printed specification of the above numbered patent requiring correction and that the said Letters Patent should read as corrected below.

Column 8, lines 11 and 12, for "instance" read -- inductance --; same line 12, for "conductor" read -- inductor --; column 9, line 55, strike out "and".

Signed and sealed this 8th day of April 1958.

(SEAL)
Attest:

KARL H. AXLINE
Attesting Officer

ROBERT C. WATSON
Commissioner of Patents